United States Patent
Htay et al.

(10) Patent No.: US 9,614,743 B2
(45) Date of Patent: Apr. 4, 2017

(54) SYSTEMS AND METHODS TO COMPUTE CARBON FOOTPRINT OF NETWORK SERVICES WITH NETWORK FUNCTION VIRTUALIZATION (NFV) AND SOFTWARE DEFINED NETWORKING (SDN)

(71) Applicants: Aung Htay, Alpharetta, GA (US); Paul Hudgins, Roswell, GA (US); Mallikarjunappa Kore, Alpharetta, GA (US)

(72) Inventors: Aung Htay, Alpharetta, GA (US); Paul Hudgins, Roswell, GA (US); Mallikarjunappa Kore, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 358 days.

(21) Appl. No.: 14/464,186

(22) Filed: Aug. 20, 2014

(65) Prior Publication Data

US 2016/0057039 A1 Feb. 25, 2016

(51) Int. Cl.
*G06F 11/30* (2006.01)
*H04L 12/26* (2006.01)
(Continued)

(52) U.S. Cl.
CPC ...... *H04L 43/0876* (2013.01); *G06F 9/45558* (2013.01); *G06F 9/50* (2013.01); *G06F 9/5027* (2013.01); *G06F 9/5072* (2013.01); *G06F 11/3003* (2013.01); *G06F 11/3055* (2013.01); *G06F 11/3062* (2013.01); *G06F 2009/4557* (2013.01); *Y02B 60/00* (2013.01);
(Continued)

(58) Field of Classification Search
CPC .. H05K 7/20836; G06Q 10/10; G06N 99/005; G06F 9/5094; G06F 1/206; G06F 9/50; G06F 9/5027; G06F 9/5072; G06F 9/45558; G06F 11/3003; G06F 11/3055; G06F 11/3062; F24D 17/02; B01J 19/0093; Y02B 60/00; Y02B 60/16; Y02B 60/165
See application file for complete search history.

(56) References Cited

U.S. PATENT DOCUMENTS

| | | | | |
|---|---|---|---|---|
| 2011/0137469 A1* | 6/2011 | Sharma | ............. | H05K 7/20836 700/282 |
| 2011/0270464 A1* | 11/2011 | Marwah | ............. | H05K 7/20836 700/300 |

(Continued)

OTHER PUBLICATIONS

Bouley, "Estimating a Data Center's Electrical Carbon Footprint," 2010, Schneider Electric, pp. 1-13.*
(Continued)

*Primary Examiner* — Le H Luu
(74) *Attorney, Agent, or Firm* — Clements Bernard Walker PLLC; Christopher L. Bernard; Lawrence A. Baratta, Jr.

(57) ABSTRACT

A method, through a server, to determine carbon footprint of a network service, in a network, includes determining power consumption and cooling requirements of network devices associated with the network service; determining associated carbon footprint coefficients for power sources associated with each of the network devices; and determining carbon footprint of the network service based on the power consumption, the cooling requirements, and the associated carbon footprint coefficients.

17 Claims, 8 Drawing Sheets

(51) Int. Cl.
 *G06F 9/455* (2006.01)
 *G06F 9/50* (2006.01)
(52) U.S. Cl.
 CPC ............ *Y02B 60/148* (2013.01); *Y02B 60/16* (2013.01); *Y02B 60/165* (2013.01)

(56) References Cited

U.S. PATENT DOCUMENTS

| | | | | |
|---|---|---|---|---|
| 2011/0314856 A1* | 12/2011 | Willgohs | ................ | F24D 17/02 62/235.1 |
| 2012/0173444 A1* | 7/2012 | Zik | ........................ | G06Q 10/10 705/317 |
| 2012/0284216 A1* | 11/2012 | Hamann | ................ | G06F 1/206 706/12 |
| 2015/0199250 A1* | 7/2015 | Mankovskii | ........ | G06F 11/3003 713/300 |
| 2015/0227397 A1* | 8/2015 | Gogula | ................ | G06F 9/5094 718/104 |
| 2016/0045841 A1* | 2/2016 | Kaplan | ................ | B01J 19/0093 429/49 |
| 2016/0217378 A1* | 7/2016 | Bellala | ................. | G06N 99/005 |

OTHER PUBLICATIONS

Lundie et al., "Carbon Footprint Measurement Methodology Report," Jan. 12, 2009, Fonterra Co-Operative Group Limited, pp. 1-33.*
"Carbon emissions of different fuels," BIOMASS Energy Center, pp. 1-3. No Date.*
"Evolving From Static to On-Demand Connectivity Services," Ciena Corporation, pp. 1-7, 2014.
Baldwin, "Carbon footprint of electricity generation," Parliamentary Office of Science and Technology, pp. 1-21.
"Multi-Tenant Network Resource Broker and Scheduling Application for On-Demand Services," Ciena Corporation, pp. 1-4, 2014.
"V-Wan Solution," Ciena Corporation, pp. 1-7, 2014.

* cited by examiner

SYSTEMS AND METHODS TO COMPUTE CARBON FOOTPRINT OF NETWORK SERVICES WITH NETWORK FUNCTION VIRTUALIZATION (NFV) AND SOFTWARE DEFINED NETWORKING (SDN)

FIELD OF THE DISCLOSURE

The present disclosure relates generally to networking systems and methods. More particularly, the present disclosure relates to systems and methods to track carbon footprint of network and cloud services.

BACKGROUND OF THE DISCLOSURE

A carbon footprint has historically been defined as "the total sets of greenhouse gas emissions caused by an organization, event, product or person." Corporations and enterprises are undertaking green initiatives to use renewable power sources and/or to lower the enterprise data center power costs. With the emergence of cloud services, corporations and enterprises are shifting from their private infrastructures to the hybrid and public cloud infrastructures. There is a need to measure and assign carbon footprint (CF) proportionately to corporations and enterprises based on the network, compute and storage usage of these infrastructures, across the service providers, to assess impact of green initiatives.

BRIEF SUMMARY OF THE DISCLOSURE

In an exemplary embodiment, a method, through a server, to determine carbon footprint of a network service, in a network, includes determining power consumption and cooling requirements of network devices associated with the network service; determining associated carbon footprint coefficients for power sources associated with each of the network devices; and determining carbon footprint of the network service based on the power consumption, the cooling requirements, and the associated carbon footprint coefficients. The power consumption and the cooling requirements of the network devices can be determined for all equipment at each of the network devices and apportioned to the network service based on how much the network service uses at each of the network devices. The power consumption and the cooling requirements of the network devices can be determined based on current inventory of modules at each of the network devices. The network devices can include L0, L1, and L2 components in a multi-layer network and a plurality of servers operating Virtual Machines, and wherein the network service is at L0, L1, and L2 over the multi-layer network and one or more of the Virtual Machines. The method can further include operating a hypervisor to manage Network Function Virtualization through one or more Virtual Machines associated with the network service. The method can further include relocating the one or more Virtual Machines based on determining a reduced carbon footprint. The server can be a Software Defined Networking controller.

In another exemplary embodiment, a server configured to determine carbon footprint of a network service, in a network, includes a network interface, a processor, and a data store, each communicatively coupled to one another; and memory storing computer-executable instructions that, when executed, cause the processor to determine power consumption and cooling requirements of network devices associated with the network service, determine associated carbon footprint coefficients for power sources associated with each of the network devices, and determine carbon footprint of the network service based on the power consumption, the cooling requirements, and the associated carbon footprint coefficients. The power consumption and the cooling requirements of the network devices can be determined for all equipment at each of the network devices and apportioned to the network service based on how much the network service uses at each of the network devices. The power consumption and the cooling requirements of the network devices can be determined based on current inventory of modules at each of the network devices. The network devices can include L0, L1, and L2 components in a multi-layer network and a plurality of servers operating Virtual Machines, and wherein the network service is at L0, L1, and L2 over the multi-layer network and one or more of the Virtual Machines. The memory storing computer-executable instructions that, when executed, can further cause the processor to operate a hypervisor to manage Network Function Virtualization through one or more Virtual Machines associated with the network service. The memory storing computer-executable instructions that, when executed, can further cause the processor to cause relocation of the one or more Virtual Machines based on determining a reduced carbon footprint. The server can be a Software Defined Networking controller.

In a further exemplary embodiment, a network configured to provide a network service, includes a plurality of interconnected network devices; and a controller comprising a network interface, a processor, and a data store, each communicatively coupled to one another, and memory storing computer-executable instructions that, when executed, cause the processor to determine power consumption and cooling requirements of network devices associated with the network service, determine associated carbon footprint coefficients for power sources associated with each of the network devices, and determine carbon footprint of the network service based on the power consumption, the cooling requirements, and the associated carbon footprint coefficients. The power consumption and the cooling requirements of the network devices can be determined for all equipment at each of the network devices and apportioned to the network service based on how much the network service uses at each of the network devices. The power consumption and the cooling requirements of the network devices can be determined based on current inventory of modules at each of the network devices. The network devices can include L0, L1, and L2 components in a multi-layer network and a plurality of servers operating Virtual Machines, and wherein the network service is at L0, L1, and L2 over the multi-layer network and one or more of the Virtual Machines. The memory storing computer-executable instructions that, when executed, can further cause the processor to operate a hypervisor to manage Network Function Virtualization through one or more Virtual Machines associated with the network service. The memory storing computer-executable instructions that, when executed, can further cause the processor to cause relocation of the one or more Virtual Machines based on determining a reduced carbon footprint.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods to track carbon footprint of the network and cloud services are described. The systems and methods can use a Network Function Virtualization (NFV) application and/or a Software Defined Network (SDN) application to create customized strategies to measure (providing the ability to trade and historically track) the carbon footprint when compute, storage, and network services are used by enterprises. The systems and methods empower service providers, data center providers, utilities, and corporations to work together to start measuring the carbon footprint (CF) impact of the compute, storage and network services. The systems and methods provide differentiation in the SDN controller and SDN/NFV application space to provide a leg up on the competition. It is expected that network operators will increase revenue and recognition based on providing accurate carbon footprint data. Finally, the systems and methods provide an optimized method to calculate carbon footprint to enable optimization in the network.

Exemplary SDN Network

Figure 1:
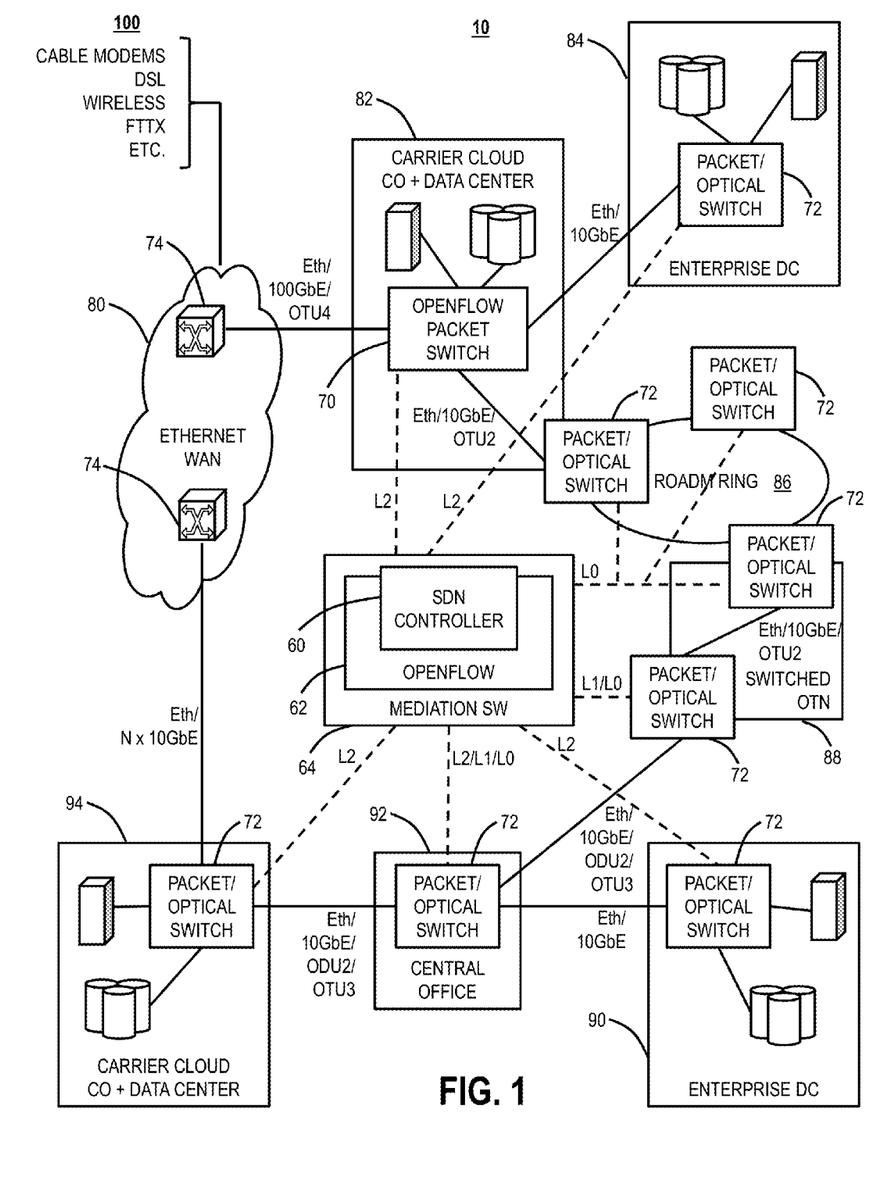
FIG. 1 is a network diagram of an exemplary SDN network.

Referring to FIG. 1, in an exemplary embodiment, a network diagram illustrates an exemplary SDN network 10. The SDN network 10 is shown for illustration purposes to describe SDN functionality at Layers 0, 1, 2, and 3. Those of ordinary skill in the art will recognize that any SDN network configuration at Layers 0, 1, 2, and 3 is contemplated. The SDN network 10 is an SDN network, which includes an SDN controller 60 with the ability to centrally program provisioning of forwarding on the network 10 in order for more flexible and precise control over network resources to support new services. OpenFlow (www.openflow.org) is an implementation of this which requires a special OpenFlow interface 62 from the SDN controller 60, via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Specification, Version 1.1.0 (February 2011)—Version 1.3.0 (June 2012), the contents of which are incorporated by reference herein. Other SDN protocols besides OpenFlow are also contemplated with the systems and methods described herein.

Again, for illustration purposes, the SDN network 10 includes an OpenFlow packet switch 70, various packet/optical switches 72, and packet switches 74 with the switches 70, 72 each communicatively coupled to the SDN controller 60 via the OpenFlow interface 62 and the mediation software 64 at any of Layers 0-2 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. Again, the network 10 is shown just to provide context and typical configurations at Layers 0-3 in an SDN network for illustration purposes.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-2 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., and at Layer 2, the packet/optical switches 72 can provide Ethernet packet switching. An exemplary configuration of the packet/optical switches 72 and the OpenFlow packet switch 70 is illustrated in FIG. 1. The packet switches 74 can be traditional Ethernet switches that are not controlled by the SDN controller 60. Note, the network 10 can include various additional network elements and devices such as, without limitation, Storage Area Networking (SAN) devices, high performance blade servers, wireless access points and/or base stations, security appliances, servers running Virtual Machines (VMs), Local Area Networking (LAN) switches, hubs, and/or bridges, NFV devices, and the like.

In an exemplary embodiment, the systems and methods include an application which tracks power usages, through the SDN network 10, in the data centers 82, 84, 90, 94, and through the access technologies such that carbon footprint can be computed. This information can be granular on per user or group of users' basis. Based on the carbon footprint information, enterprises can optimize their network services such as through migration to providers with lower carbon footprint, moving virtualized data centers over the day to maximize usage of green power, participate in carbon credit trading (such as through the International Emissions Trading Association (IETA)), and the like.

SDN Controller

Figure 2:
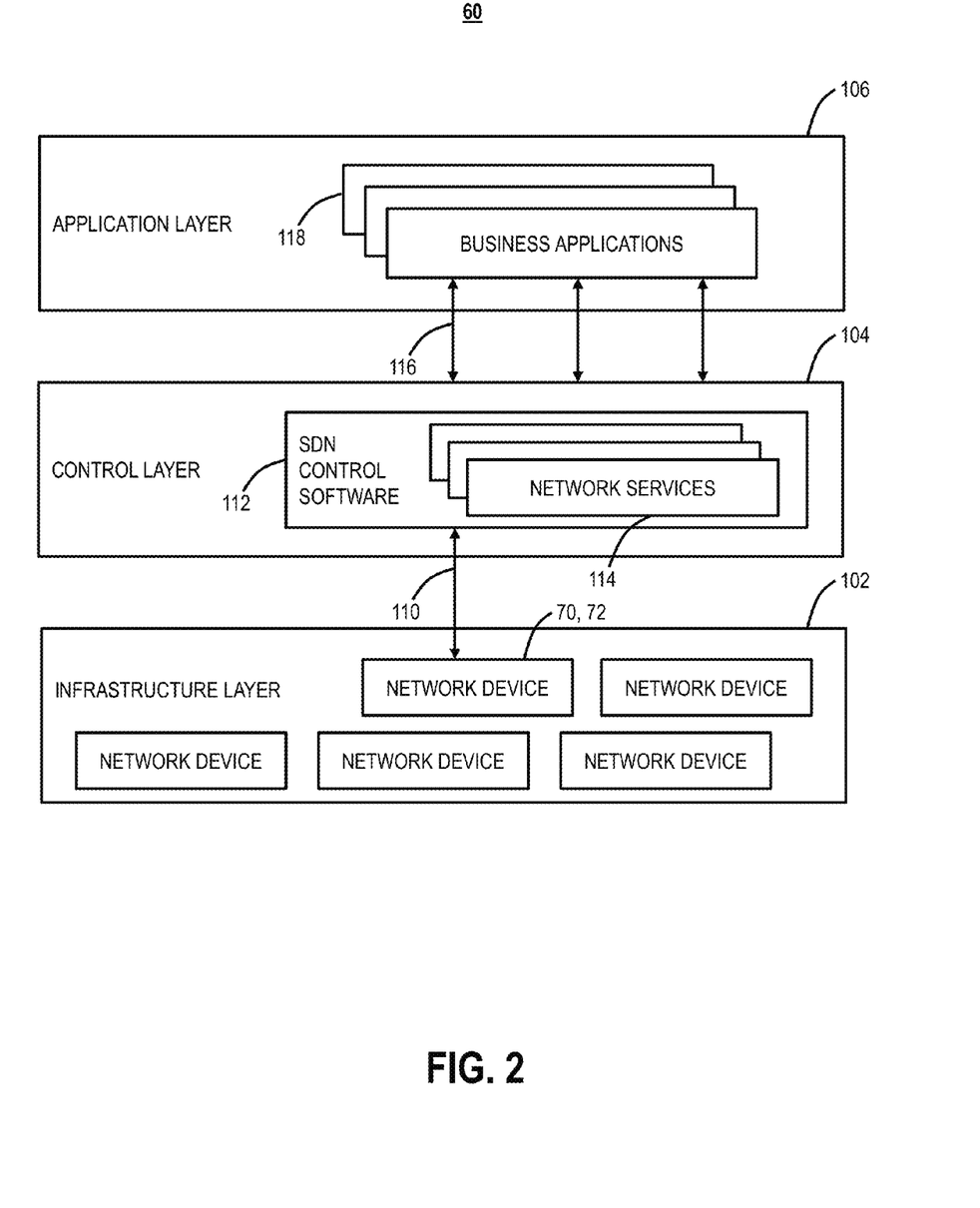
FIG. 2 is a block diagram of functional components of an SDN controller.
Figure 3:
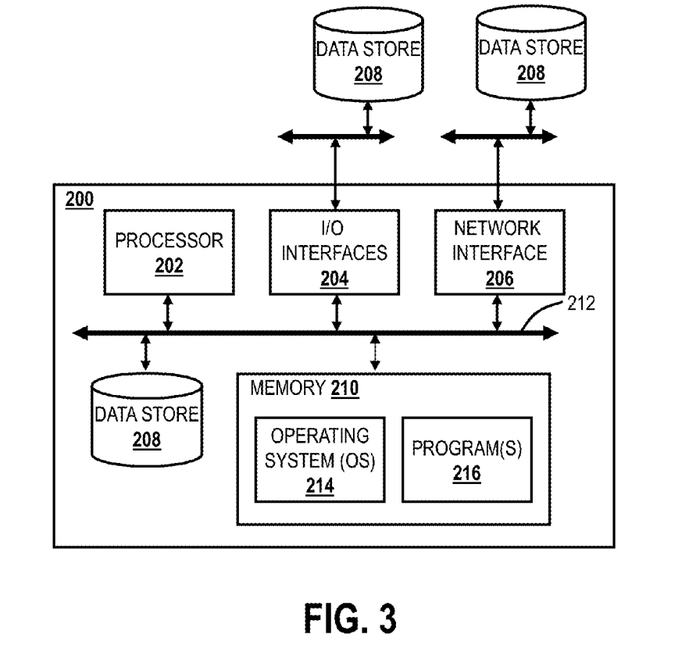
FIG. 3 is a block diagram of a server which may be used to realize the SDN controller of FIG. 2, in other systems, or standalone.

Referring to FIG. 2, in an exemplary embodiment, a block diagram illustrates functional components of the SDN controller 60. The SDN controller 60 can be a server or the like, such as illustrated in FIG. 3 and the functional components can be implemented in software executed on the server. The SDN controller 60 includes an infrastructure layer 102, a control layer 104, and an application layer 106. The infrastructure layer 102 is communicatively coupled to network devices such as the switches 70, 72 via a control plane interface 110 such as OpenFlow. The infrastructure layer 102 allows communication between the SDN controller 60 and the network devices. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN such as software modules and/or functions responsible for creating desired path and flow connections on the physical network through various business applications 118. In an exemplary embodiment, the systems and methods to measure and track CF are implemented as one of the business applications 118.

Exemplary Server Architecture

Referring to FIG. 3, in an exemplary embodiment, a block diagram illustrates a server 200 which may be used to realize the SDN controller 60, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications between the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered list of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Network providing a Network Service

Figure 4:
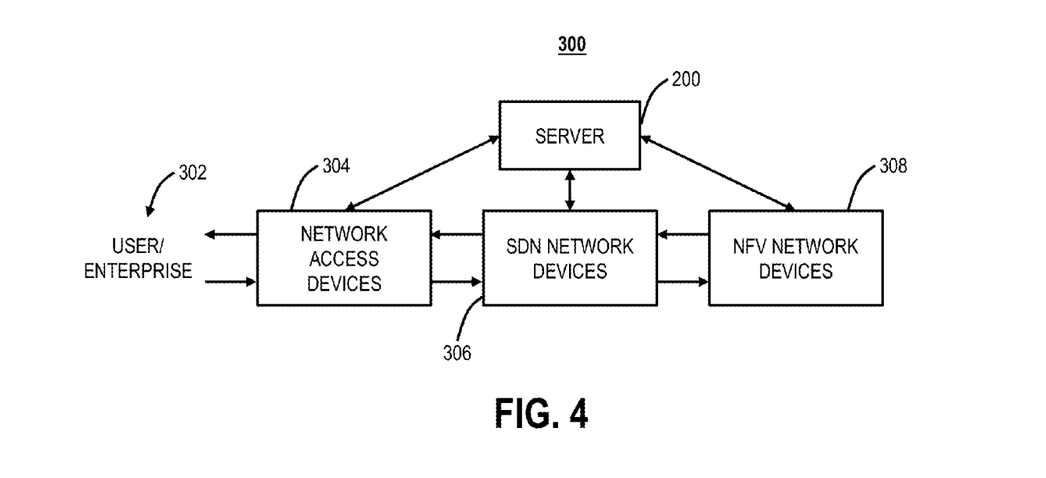
FIG. 4 is a network diagram of a logical network providing a network service to an enterprise or user.

Referring to FIG. 4, in an exemplary embodiment, a network diagram illustrates a logical network 300 providing a network service to an enterprise or user, i.e. an enterprise 302. To provide the network service, the enterprise 302 connects to network access devices 304 which connect to SDN network devices 306 to provide network functions through NFV network devices 308. Note, the access devices 304 can also be part of the SDN network devices 306 as well, such that there are just two components—the SDN network devices 306 and the NFV network devices 308. The access devices 304 and the SDN network devices 306 can be similar to the various components in the SDN network 10 in FIG. 1. The NFV network devices 308 can include various devices, appliances, components, etc. that decouple the network functions, such as network address translation (NAT), firewalling, intrusion detection, Domain Name Service (DNS), caching, data storage, computing, etc., from proprietary hardware appliances, so they can run in software. Note, each of the devices 304, 306, 308 can be either communicatively coupled to the server 200 or have associated data stored in the server 200. Further, each of the devices 304, 306, 308 is physical hardware that is powered from a power source enabling a carbon footprint calculation for its operation. In various exemplary embodiments, the systems and methods described herein can apportion the enterprise 302 usage of the devices 304, 306, 308 for the network service and provide the carbon footprint based thereon.

This computed carbon footprint can become a network parameter in the SDN network 10, the SDN network devices 306, and the NFV network devices 308. The network parameter can be used for routing (e.g., preference lower carbon footprint devices), for green optimization (e.g., moving Virtual Machines (VM) to lower carbon footprints), and the like. The carbon footprint can be computed when the network service is provisioned such as to become a routing parameter to minimize carbon footprint. The carbon footprint can also be computed over time to become a parameter that may be optimized by moving the network service.

Carbon Footprint Computation Process

Figure 5:
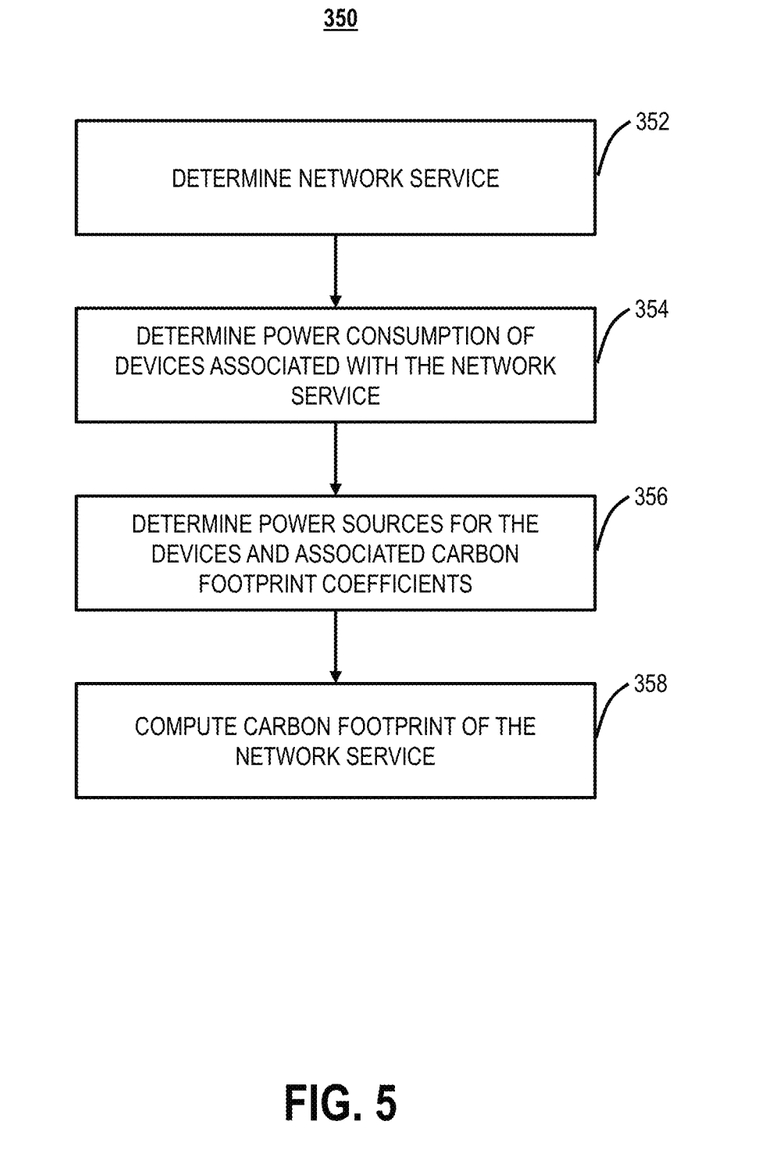
FIG. 5 is a flow chart of a carbon footprint computation process.

Referring to FIG. 5, in an exemplary embodiment, a flow chart illustrates a carbon footprint computation process 350. The process 350 contemplates operation on the SDN controller 60, the server 200, or the like for a network service associated with the enterprise 302 (or a single user). The process 350 includes determining a network service (step 352). The network service describes which devices 304, 306, 308 are used by the enterprise 302 and how to apportion the power and carbon footprint for each of the devices 304, 306, 308 to the enterprise 302. Specifically, it is assumed that the enterprise 302 will only use a portion of the devices 304, 306, 308, so the process 350 includes only apportioning the amount of power and carbon footprint being used by the enterprise 302.

The process 350 includes determining power consumption of the devices 304, 306, 308 associated with the network service (step 354). This is described in detail herein. For example, power consumption for equipment in the devices 304, 306, 308 can be determined on a per-card or per-chassis basis. The power consumption can be determined by identifying what hardware is being used in the devices 304, 306, 308 and performing a database lookup for associated power consumption. Alternatively, the determined power consumption can be provided automatically by hardware, software, and/or firmware associated with the devices 304, 306, 308, i.e. management software of the devices 304, 306, 308 can provide the power consumption values.

The process 350 includes determining power sources for the devices 304, 306, 308 and the associated carbon footprint coefficients (step 356). In order to calculate the carbon footprint, based on the known power consumption from the step 354, the chassis power source(s) need to be determined, each of which will have an associated carbon footprint (CF) coefficient. It is assumed this coefficient will be dynamic and could be estimated but it would be best if the power generators provided a way to get their dynamic value. If estimation is needed, EPA data are used. For example, emissions from electricity generation based off figures from the EPA's eGRID emission factors based on 2009 and 2012 data are, on average, electricity sources emit 1.2221 bs $CO_2$ per kWh (0.0005925 metric tons $CO_2$ per kWh). Also, $CO_2$ emissions per kWh may vary greatly in accordance with the amount of clean energy in the energy supply.

For an example of how a power source's coefficient might vary, Florida Power and Light has a site that uses solar energy when available. During night time and weather related interruption, it switches to natural gas, which would have a higher coefficient compared to solar. With this dynamic carbon footprint aspect, it may make sense for an enterprise to move its Virtual Machines (VMs) from one data center (DC) to another in an attempt to "follow the sun" if the carbon footprint savings is greater than the carbon footprint cost of moving the VMs. The process 350 can have details of the power source and perform a lookup or the process 350 can automatically retrieve details of the power source over a network by connecting to the power provider.

Once the power consumption and the carbon footprint coefficient are known, the process 350 can compute the carbon footprint of the network service (step 358). Again, for a network service: 1) a carbon footprint calculation is needed for the service establishment (turning up new or reusing existing layer's resources), and 2) a carbon footprint calculation is needed for the usage during its lifespan. Note, there is a carbon footprint value when no traffic is flowing (idle) due to lasers being "on" (how much power is attributed to each service using a wavelength needs to be determined). There is an additional carbon footprint value when traffic is flowing due to circuitry "working". There is a need for metering to help determine how much power is attributed to each service using the resources. Thus, the power consumption of the devices 304, 306, 308 is well documented and the carbon footprint associated with each can be proportionally attributed to the enterprise 302. For the devices 304, 306, 308, the process 350 can estimate a carbon footprint value based on provided power consumption specifications and proportionally divide by the total number of services using the equipment.

Hypervisor for VMs

Figure 6:
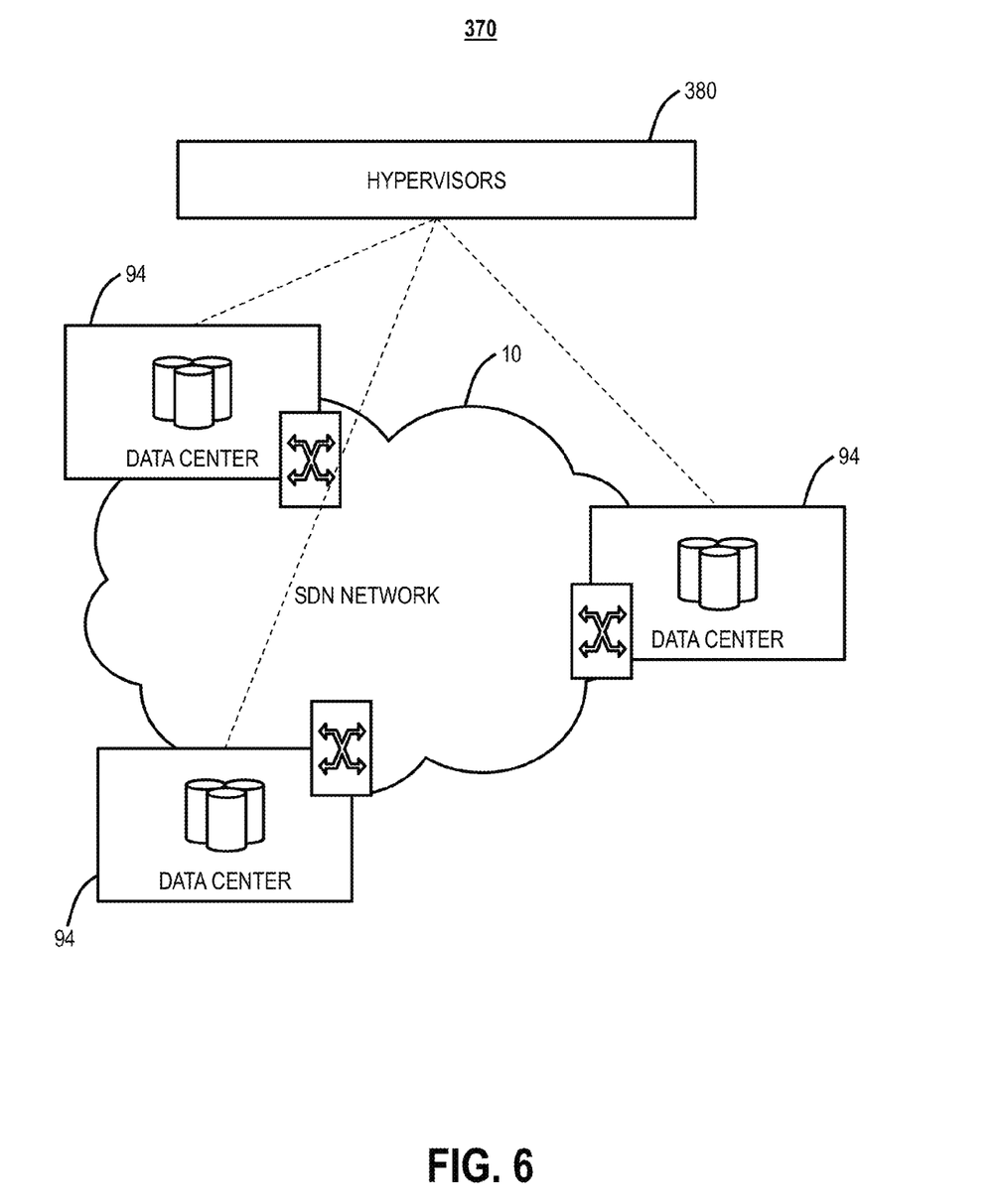
FIG. 6 is a network diagram of a network with a hypervisor.

Referring to FIG. 6, in an exemplary embodiment, a network diagram illustrates a network 370 with a hypervisor 380. The network 370, for illustration purposes, includes the SDN network 10 with three exemplary data centers 94. The hypervisor 380 is software, firmware, and/or hardware that creates and runs Virtual Machines (VMs). In an exemplary aspect, the systems and methods contemplate using computed carbon footprints to initiate movement of the VMs for the network service. The hypervisor 380 can be a network resource broker and scheduling application that offers immediate or scheduled bandwidth-on-demand to the enterprise 302 through an end-user portal or applications such as cloud and NFV orchestration systems via its open northbound API. Additionally, the hypervisor 380 can include a network service health monitoring application; a Web portal application; a data center integration application that orchestrates bandwidth on-demand from the enterprise data center, across multiple network operator domains, to the selected cloud provider based on transaction auto-detection; and On-demand Service Virtual Private Networks (VPNs).

The process 350 can be utilized to compute the carbon footprint to move VMs. A Path Computation Engine (PCE) can use the maximum carbon footprint as service constraint when finding a route for the connection request. The route with the lowest carbon footprint is returned, if requested. As VM requests are received, the carbon footprint cost of network usage due to VM movement can be computed. If the new Data Center (DC) has a lower carbon footprint than the old DC it makes sense to allow the movement to execute. The computed carbon footprint due to movement is then added to the enterprise associated with the VM.

Now, data centers are being deployed commercially with co-location, creating choice for the enterprise 302. There is a need for commercial data center operators to differentiate their service, and the process 350 offers an opportunity to market the data center based on reduced carbon footprint. Additionally, the enterprise 302 can utilize multiple data centers concurrently as well as move IT assets over time.

Exemplary Mobile Device

Figure 7:
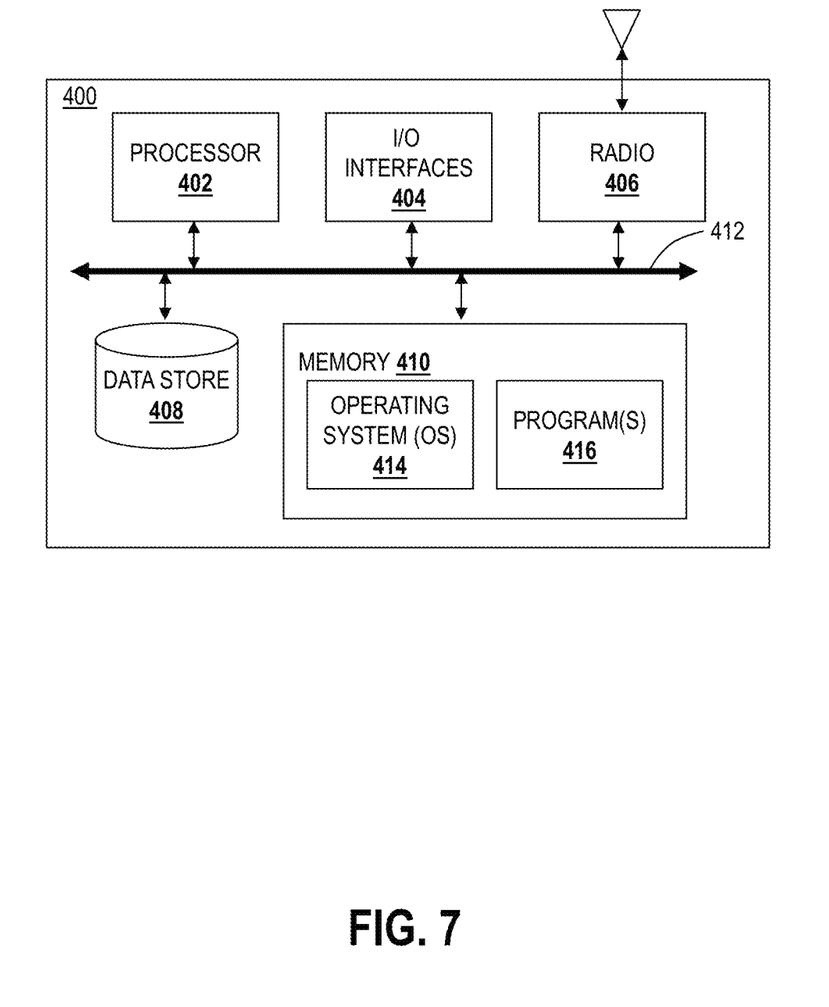
FIG. 7 is a block diagram of a mobile device which may be used with the systems and methods described herein.

Referring to FIG. 7, in an exemplary embodiment, a block diagram of a mobile device 400 which may be used with the systems and methods described herein. For example, the mobile device 400 can include, without limitation, a smart phone, a radio, a tablet, a vehicle modem, etc. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 7 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications between the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered list of executable instructions for implementing logical functions. In the example of FIG. 7, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400, including those mobile device functions set forth herein.

The process 350 also contemplates operation with an individual user, i.e. with the mobile device 400. The personal carbon footprint can be calculated from bandwidth usage. For smart phones, i.e. the mobile device 400, the process 350 can track the bandwidth through the multi-layer network 10 and allocate the carbon footprint proportionately. The more bandwidth, the more carbon footprint. In addition, the process 350 can even allocate an incremental carbon footprint when the mobile device 400 is recharged. In an exemplary embodiment, there can be an application ("app") as one of the programs 416 which interfaces with a service provider application which can interface with the SDN controller 60, the server 200, etc. for implementing the process 350. The mobile device 400's green activities can be tracked as well. For example, a donation to plant a tree can provide a negative carbon footprint value. With the ability to compute and track carbon footprint, users can trade their negative carbon footprint to others to lower their carbon footprint.

The carbon footprint of the mobile device 400 can be computed in a similar fashion as the enterprise 302. The overall equipment carbon footprint is computed, i.e. through the devices 304, 306, 308, and proportionally applied to the mobile device 400 based on usage. Note, in the case of the mobile device 400, the network access devices 304 can include wireless base stations like Evolved Node Bs. For example, significant research is going into mobile device power optimization. In an exemplary embodiment, the process 350 can use the techniques described by Thiagarajan et al., "Who Killed My Battery: Analyzing Mobile Browser Energy Consumption," WWW 2012, Apr. 16-20, 2012, Lyon, France, available online at mobisocial.stanford.edu/papers/boneh-www2012.pdf, which states:

"Despite the growing popularity of mobile web browsing, the energy consumed by a phone browser while surfing the web is poorly understood. We present an infrastructure for measuring the precise energy used by a mobile browser to render web pages. We then measure the energy needed to render financial, e-commerce, email, blogging, news and social networking sites. Our tools are sufficiently precise to measure the energy needed to render individual web elements, such as cascade style sheets (CSS), Javascript, images, and plug-in objects. Our results show that for popular sites, downloading and parsing cascade style sheets and Javascript consumes a significant fraction of the total energy needed to render the page. Using the data we collected we make concrete recommendations on how to design web pages so as to minimize the energy needed to render the page. As an example, by modifying scripts on the Wikipedia mobile site we reduced by 30% the energy needed to download and render Wikipedia pages with no change to the user experience. We conclude by estimating the point at which offloading browser computations to a remote proxy can save energy on the phone"

In an exemplary aspect, the systems and methods contemplating allowing network operators to sell services based on carbon footprint as a selling point. For example, a data center with a low carbon footprint, which is verified though the process 350, based on using green energy. Also, a wireless service, cloud service, etc. can be marketed based on eco-friendliness, carbon footprint, etc.

Exemplary Operation with Security Products

Referring back to FIG. 4, in an exemplary embodiment, an example is described for security products moving to NFV. For the enterprise 302 to set up network security, physical appliances required are (using Lancope products as an example): StealthWatch Management Console (SMC), StealthWatch Flow Collector (FC), StealthWatch Flow Replicator (FR) and StealthWatch Flow Sensor (FS). For each of these appliances, the power usage information as well as heat dissipation (indirectly power requirement for cooling) is known from the manufacturer's specifications. The carbon footprint is calculated based on these physical appliances. These can include:

SMC (750 W and 2891 BTU/hr)
FS (from 100 W to 750 W, 341 BTU/hr to 2891 BTU/hr) depending on model (sniffing speed)

These physical appliances can be replaced by Virtual Machines(VMs) running on a machine in the data center. The power requirement and BTU information are typically published by the server 200 manufacturers like Dell, HP, etc. So, for example, the host machine is 64 cores CPU with 128 GB. Assume, for example, the SMC is replaced with a VM. Assume, again, for example, the VM is on the server 200. The carbon footprint is calculated based on virtualizing the security function on the standard IT high volume compute, storage and network hardware. The data center providers can advertise their NFV services and gain an advantage over competitors based on the reduced carbon footprint as compared to the physical appliance's carbon footprint.

To get the carbon footprint of the server 200, BTUs (British Thermal Units) must be calculated per hour. Different manufacturers may publish specifications, but for a general Intel-based server, the following example is provided.

Power consumed=Watts/efficiency

Watts×3.42=BTU/h (1 Watt is approximately 3.21214 BTU/h for a general Intel server)

In an example, using a 650 W power supply at 90% efficiency:

$$650/0.90=722$$

$$722\ W\times3.412=2{,}464\ BTU/h$$

Once BTU/h is determined (or KW/h), the carbon footprint can be computed based on the type of fuel used to generate the power. Here is an exemplary table showing $CO_2$ emissions for different fuel sources (from www.eia.gov/electricity/annual/html/epa_a_03.html):

| Fuel | Factor (Pounds of CO2 Per Million Btu) |
|---|---|
| Bituminous Coal | 205.30000 |
| Distillate Fuel Oil | 161.38600 |
| Geothermal | 16.59983 |
| Jet Fuel | 156.25800 |
| Kerosene | 159.53500 |
| Lignite Coal | 215.40000 |
| Municipal Solid Waste | 91.90000 |
| Natural Gas | 117.08000 |
| Petroleum Coke | 225.13000 |
| Propane Gas | 139.17800 |
| Residual Fuel Oil | 173.90600 |
| Synthetic Coal | 205.30000 |
| Subbituminous Coal | 212.70000 |
| Tire-Derived Fuel | 189.53800 |
| Waste Coal | 205.30000 |
| Waste Oil | 210.00000 |

Figure 8:
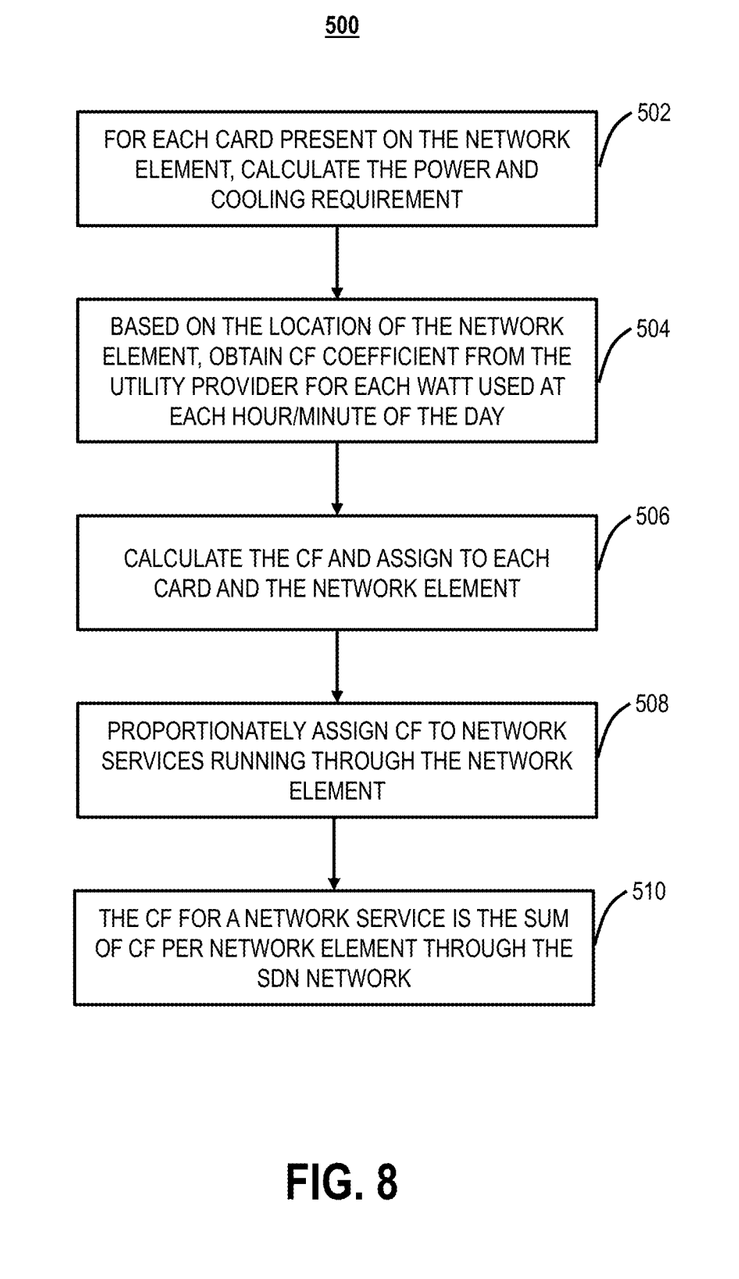
FIG. 8 is a flow chart of a carbon footprint assignment process for network services over the SDN network of FIG. 1.

Exemplary Implementation of CF Assignment Based on Network Services Over SDN Network Referring to FIG. 8, in an exemplary embodiment, a flow chart illustrates a carbon footprint assignment process 500 for network services over the SDN network 10. The assignment process 500 includes, for each card/module present on a network element, calculating the power and cooling requirement (step 502). This information can be provided by the SDN controller 60 which has a real-time inventory view of the network element. Also, data can be looked up for the power and cooling requirement for each card/module. Alternatively, this data can be automatically provided by the SDN controller 60.

The assignment process 500 includes, based on the location of the network element, obtaining a carbon footprint coefficient from the utility provider for each Watt used at each hour/minute of the day (step 504). This information can be dynamically provided by the utilities, can be looked up from various data sources, or can be estimated such as based on the table provided above. The assignment process 500 includes calculating the carbon footprint and assigning the calculated carbon footprint to each card and the network element (step 506). The steps 502, 504, 506 can be performed for all network elements in the SDN network 10.

Next, the assignment process 500 includes proportionately assigning the carbon footprint to network services running through the network element (step 508). Finally, the assignment process 500 includes the carbon footprint for a network service being the sum of carbon footprints per network element through the SDN network 10. That is, the network service can have its carbon footprint determined as follows:

$$CF=CF_{NE1}*\%_{usage}+CF_{NE2}*\%_{usage}+CF_{NE3}*\%_{usage}+\ldots+CF_{NEn}*\%_{usage}$$

Wherein $CF_{NE}$ is the carbon footprint of the network element and $\%_{usage}$ is how much of the network element is dedicated to the network service.

In the SDN network 10, equipment inventory can be retrieved on a per network element basis, including Common Language Location Identifier (CLLI). The CLLI information gives the location of the network elements. For each network element, power consumption can be calculated. In an example, each network element is using 9045 watts. For each network element, cooling requirements can be calculated for heat dissipation (51182 BTUs, for example). The dynamic carbon footprint coefficient (DCFC) for each watt usage is obtained from the utilities involved. Here is an example of the dynamic nature of DCFC. The Florida Power & Light company has a site that uses solar to generate electricity. When at night or weather condition dictates, the electricity generation switches to natural gas, which would have a higher coefficient compared to solar. If the dynamic carbon footprint coefficient is not provided by the utility, an estimation is used.

The carbon footprint can be calculated for each network element per minute. This information is stored in the database. For example, network element 1 might utilize 15 metric tons $CO_2$ equivalent per year based on the CLLI code and utility involved. An enterprise requests a service from network element 1 to network element 4. The service is routed through network element 2 and network element 3. The service provider can proportionately assign the dynamic carbon footprint for this service, as well as track the dynamic carbon footprint for the lifetime of the network service. The same sequence of calculation can be done for each network layer L0, L1, & L2 if the network is multilayer network. The same sequence of calculation is done for the protect route of the service and carbon footprint is proportionately assigned and tracked for the enterprise.

Figure 9:
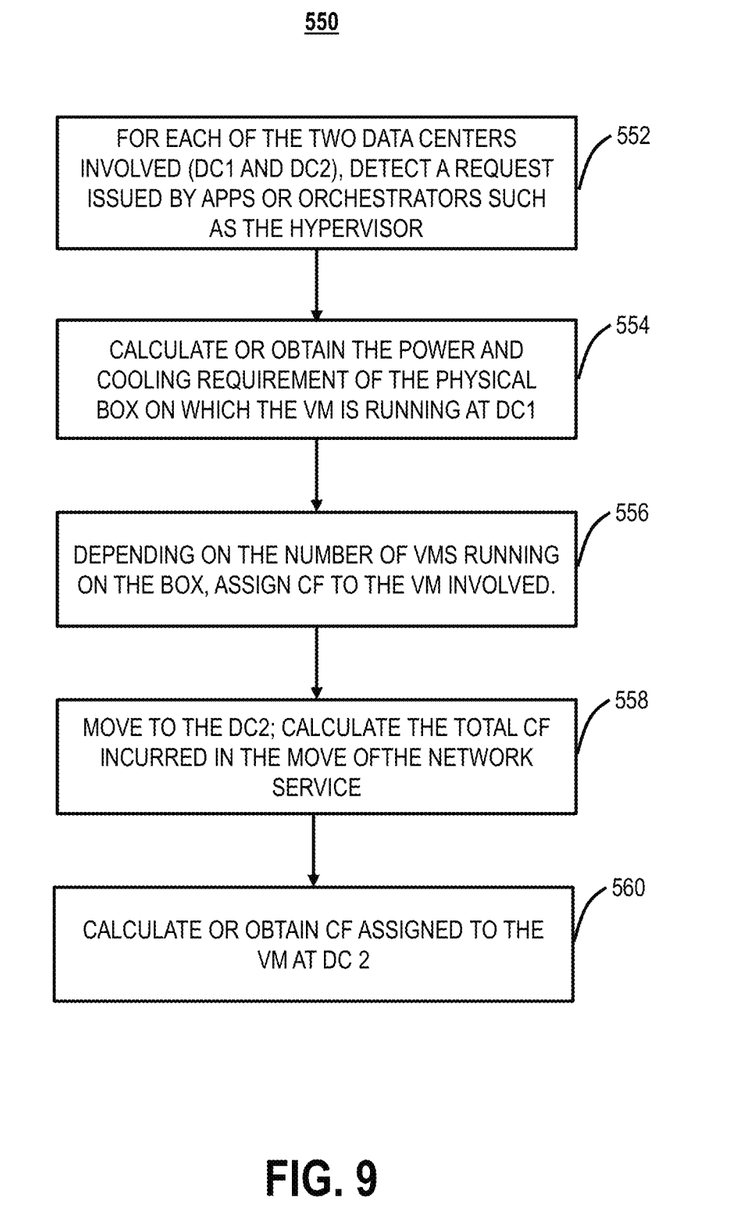
FIG. 9 is a flow chart of a carbon footprint assignment process based on VM movement over the SDN network of FIG. 1 and hosted by Data Centers.

Exemplary Implementation of CF Assignment Based on VM Movement over SDN Network and Hosted by Data Centers Referring to FIG. 9, in an exemplary embodiment, a flow chart illustrates a carbon footprint assignment process 550 based on VM movement over the SDN network 10 and hosted by Data Centers. The assignment process 550 can utilize the hypervisor 380 and is illustrated herein with two data centers, DC1 and DC2, for illustration purposes. The assignment process 550 includes, for each of the two data centers involved (DC1 and DC2), detect a request issued by apps or orchestrators such as the hypervisor 380 (step 552). The assignment process 550 includes calculating or obtaining the power and cooling requirement of the physical box on which the VM is running at DC1 (step 554). Again, this can be as described herein with respect to the server 200.

The assignment process 550 includes, depending on the number of VMs running on the box, assigning the carbon footprint to the VM involved (step 556). Here, the carbon footprint is apportioned based on percentage used. The assignment process 550 includes moving the VM to DC2 and calculating the total carbon footprint incurred in the move of the network service (step 558). For example, the hypervisor 380 can make the request and move the VM. The assignment process 550 includes calculating or obtaining the carbon footprint assigned to the VM at DC2 (step 560). Finally, the new carbon footprint cost of the VM at DC2 (which could be incremental +/−) can be provided to the enterprise 302 involved.

Exemplary Implementation of CF Assignment Based on NFV of Security Application

In another exemplary embodiment, assume non-commodity hardware like Lancope StealthWatch appliances. A physical install per appliance per site is required. The power and cooling requirement per appliance is obtained. The carbon footprint per appliance is calculated. Data Centers calculate the carbon footprint per VM utilizing the standard high volume servers, storages and switches. The carbon footprint associated with the network service over the SDN network 10 is also calculated. The new CF cost (which could be incremental +/−) can be provided to the enterprise 302 involved. Advantageously, data centers can compete on lowest carbon footprint per VM per network service.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, through a server, to determine carbon footprint of a network service, in a network, the method comprising:
    determining power consumption and cooling requirements of network devices associated with the network service;
    determining associated carbon footprint coefficients for power sources associated with each of the network devices;
    determining carbon footprint of the network service based on the power consumption, the cooling requirements, and the associated carbon footprint coefficients; and
    utilizing the carbon footprint as a routing parameter for the network service in the network,
    wherein the power consumption and the cooling requirements of the network devices are determined for all equipment at each of the network devices and apportioned to the network service based on how much the network service uses each of the network devices, wherein, for apportionment, the power consumption and the cooling requirements of the network devices for the network service is divided by a total number of services thereon.

2. The method of claim 1, wherein the power consumption and the cooling requirements of the network devices are determined based on current inventory of modules at each of the network devices.

3. The method of claim 1, wherein the network devices include L0, L1, and L2 components in a multi-layer network and a plurality of servers operating Virtual Machines, and wherein the network service is at L0, L1, and L2 over the multi-layer network and one or more of the Virtual Machines.

4. The method of claim 1, further comprising:
operating a hypervisor to manage Network Function Virtualization through one or more Virtual Machines associated with the network service.

5. The method of claim 4, further comprising:
relocating the one or more Virtual Machines based on determining a reduced carbon footprint.

6. The method of claim 1, wherein the server is a Software Defined Networking controller.

7. A server configured to determine carbon footprint of a network service, in a network, the server comprising:
a network interface, a processor, and a data store, each communicatively coupled to one another; and
memory storing computer-executable instructions that, when executed, cause the processor to
determine power consumption and cooling requirements of network devices associated with the network service,
determine associated carbon footprint coefficients for power sources associated with each of the network devices,
determine carbon footprint of the network service based on the power consumption, the cooling requirements, and the associated carbon footprint coefficients, and
utilize the carbon footprint as a routing parameter for the network service in the network,
wherein the power consumption and the cooling requirements of the network devices are determined for all equipment at each of the network devices and apportioned to the network service based on how much the network service uses each of the network devices, wherein, for apportionment, the power consumption and the cooling requirements of the network devices for the network service is divided by a total number of services thereon.

8. The server of claim 7, wherein the power consumption and the cooling requirements of the network devices are determined based on current inventory of modules at each of the network devices.

9. The server of claim 7, wherein the network devices include L0, L1, and L2 components in a multi-layer network and a plurality of servers operating Virtual Machines, and wherein the network service is at L0, L1, and L2 over the multi-layer network and one or more of the Virtual Machines.

10. The server of claim 7, wherein the memory storing computer-executable instructions that, when executed, further cause the processor to
operate a hypervisor to manage Network Function Virtualization through one or more Virtual Machines associated with the network service.

11. The server of claim 10, wherein the memory storing computer-executable instructions that, when executed, further cause the processor to
cause relocation of the one or more Virtual Machines based on determining a reduced carbon footprint.

12. The server of claim 7, wherein the server is a Software Defined Networking controller.

13. A network configured to provide a network service, the network comprising:
a plurality of interconnected network devices; and
a controller comprising a network interface, a processor, and a data store, each communicatively coupled to one another, and memory storing computer-executable instructions that, when executed, cause the processor to
determine power consumption and cooling requirements of network devices associated with the network service,
determine associated carbon footprint coefficients for power sources associated with each of the network devices,
determine carbon footprint of the network service based on the power consumption, the cooling requirements, and the associated carbon footprint coefficients, and
utilize the carbon footprint as a routing parameter for the network service in the network,
wherein the power consumption and the cooling requirements of the network devices are determined for all equipment at each of the network devices and apportioned to the network service based on how much the network service uses each of the network devices, wherein, for apportionment, the power consumption and the cooling requirements of the network devices for the network service is divided by a total number of services thereon.

14. The network of claim 13, wherein the power consumption and the cooling requirements of the network devices are determined based on current inventory of modules at each of the network devices.

15. The network of claim 13, wherein the network devices include L0, L1, and L2 components in a multi-layer network and a plurality of servers operating Virtual Machines, and wherein the network service is at L0, L1, and L2 over the multi-layer network and one or more of the Virtual Machines.

16. The network of claim 13, wherein the memory storing computer-executable instructions that, when executed, further cause the processor to
operate a hypervisor to manage Network Function Virtualization through one or more Virtual Machines associated with the network service.

17. The network of claim 16, wherein the memory storing computer-executable instructions that, when executed, further cause the processor to cause relocation of the one or more Virtual Machines based on determining a reduced carbon footprint.

* * * * *